United States Patent
Parker (10) Patent No.: US 9,096,304 B2
(45) Date of Patent: Aug. 4, 2015

(54) METHOD OF COUPLING AEROFOIL SURFACE STRUCTURES AND AN AEROFOIL ASSEMBLY

(71) Applicant: Airbus Operations Limited, Bristol (GB)

(72) Inventor: Simon John Parker, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 242 days.

(21) Appl. No.: 13/907,240

(22) Filed: May 31, 2013

(65) Prior Publication Data

US 2013/0336795 A1 Dec. 19, 2013

(30) Foreign Application Priority Data

May 31, 2012 (GB) .................................. 1209697.0

(51) Int. Cl.
  *B64C 1/00* (2006.01)
  *B64C 3/00* (2006.01)
  *B64C 5/08* (2006.01)
  *B64C 23/06* (2006.01)

(52) U.S. Cl.
  CPC ... *B64C 3/00* (2013.01); *B64C 5/08* (2013.01); *B64C 23/065* (2013.01); *Y02T 50/164* (2013.01); *Y10T 29/49337* (2015.01)

(58) Field of Classification Search
  None
  See application file for complete search history.

(56) References Cited

U.S. PATENT DOCUMENTS

| | | | | | |
|---|---|---|---|---|---|
| 2,712,421 | A | * | 7/1955 | Naumann | 244/49 |
| 3,039,721 | A | * | 6/1962 | Rogers, Jr. | 244/135 R |
| 3,081,053 | A | * | 3/1963 | Jarrell | 244/49 |
| 3,666,210 | A | * | 5/1972 | Look et al. | 244/218 |
| 4,691,880 | A | * | 9/1987 | Frank | 244/49 |
| 4,717,093 | A | * | 1/1988 | Rosenberger et al. | 244/49 |
| 4,918,786 | A | * | 4/1990 | Perry | 16/365 |
| 5,356,094 | A | * | 10/1994 | Sylvain | 244/49 |
| 5,372,336 | A | * | 12/1994 | Paez | 244/49 |
| 5,558,299 | A | * | 9/1996 | Veile | 244/49 |
| 5,634,613 | A | * | 6/1997 | McCarthy | 244/199.1 |
| 6,260,798 | B1 | * | 7/2001 | Casiez et al. | 244/49 |
| 6,834,828 | B1 | * | 12/2004 | Tritt | 244/3.27 |
| 7,550,864 | B2 | * | 6/2009 | Anderson et al. | 290/55 |

(Continued)

FOREIGN PATENT DOCUMENTS

| | | |
|---|---|---|
| GB | 608060 | 9/1948 |
| GB | 627121 | 7/1949 |
| WO | 2011051699 | 5/2011 |

OTHER PUBLICATIONS

UK Search Report for Application No. 1209697.0 mailed Sep. 12, 2012.

*Primary Examiner* — Christopher P Ellis
*Assistant Examiner* — Medhat Badawi
(74) *Attorney, Agent, or Firm* — Lowe Hauptman & Ham, LLP (57) ABSTRACT

A method of attaching first and second aerofoil sections to each other is disclosed. The method comprises the steps of: positioning one aerofoil section in an initial assembly orientation with respect to the other aerofoil section so that hinge elements on each aerofoil section are in alignment with each other, inserting a hinge shaft through said aligned hinge elements to initially couple the aerofoil sections together whilst the aerofoil sections are in their initial assembly orientation; and rotating one aerofoil section relative to the other aerofoil section about a compound angle defined by the hinge shaft into a second orientation in which the aerofoil sections are in their final, assembled orientation relative to each other. An aerofoil assembly is also disclosed.

16 Claims, 10 Drawing Sheets

(56) References Cited

U.S. PATENT DOCUMENTS

| | | | |
|---|---|---|---|
| 7,582,977 B1* | 9/2009 | Dehlsen | 290/1 R |
| 8,387,913 B2* | 3/2013 | Karem | 244/49 |
| 8,419,362 B2* | 4/2013 | Bertolotti et al. | 416/1 |
| 8,506,248 B2* | 8/2013 | Wilson | 416/23 |
| 8,511,996 B2* | 8/2013 | Llorente Gonzalez et al. | 416/132 B |
| 8,584,984 B2* | 11/2013 | Parks et al. | 244/49 |
| 8,657,226 B1* | 2/2014 | McGinnis | 244/45 R |
| 8,827,644 B2* | 9/2014 | Behrens et al. | 416/24 |
| 8,834,127 B2* | 9/2014 | Giguere et al. | 416/228 |
| 8,894,018 B2* | 11/2014 | Boer et al. | 244/199.4 |
| 2003/0138290 A1* | 7/2003 | Wobben | 403/293 |
| 2006/0275121 A1* | 12/2006 | Merswolke et al. | 416/132 B |
| 2012/0027595 A1* | 2/2012 | Pesetsky | 416/147 |

* cited by examiner

METHOD OF COUPLING AEROFOIL SURFACE STRUCTURES AND AN AEROFOIL ASSEMBLY

RELATED APPLICATIONS

The present application is based on, and claims priority from, Great Britain Application Number 1209697.0, filed May 31, 2012, the disclosure of which is hereby incorporated by reference herein in its entirety.

FIELD OF THE INVENTION

The invention relates to a method for coupling two aerofoil surface structures together. Particularly, the invention relates to a method in which two aerofoil surface structures are initially coupled via a hinge in a first, assembly orientation to subsequently allow one of those aerofoil surface structures to be pivoted about the hinge axis relative to the other aerofoil surface structure into a second orientation in which the aerofoil structures are finally coupled together in a fully assembled orientation and in which the aerofoil surface structures remain until repair or replacement. The invention also relates to an aerofoil assembly comprising aerofoil sections that have been coupled according to the method of the invention.

BACKGROUND TO THE INVENTION

As the demand for more fuel-efficient and quieter aircraft increases, aero structures are becoming more advanced and a demand for aerofoils with larger surface area but smaller cross-sectional height is apparent. As a result, the limitations of conventional attachment structures and fixings used to couple sections of an aerofoil to each other have been reached or exceeded because of the restricted area of contact between wing sections resulting in a lack of space for conventional fixings which is exacerbated by regulations that restricts the minimum spacing between fixing holes. It is also apparent that conventional fixings are not always able to withstand the high level of stresses placed upon them when they are used with such new and developing wing geometries.

An aerofoil having two sections is described with reference to the Applicant's own earlier application GB200919019 filed on 30 Oct. 2009. The outboard section is able to rotate about a hinge shaft set at a compound angle relative to a longitudinal axis extending along the length of the wing and a chordal axis extending at ninety-degrees to the longitudinal axis, so that the outboard section assumes a stowed, substantial vertical, position when the aircraft is not in flight, thereby enabling the aircraft to have a much longer wingspan than is normal but at the same time achieving the practicalities of an aircraft with a shorter wingspan in terms of being able to use a standard airport gate.

It has now been appreciated that the wing geometry and compound hinge arrangement known from the aforementioned earlier application can also be used in applications where two aerofoil structures are to be coupled together, even in aircraft with a conventional wingspan and where there is no intention of rotating one aerofoil structure relative to the other aerofoil structure when the aircraft is not in flight but in which the aerofoil structures are to remain in their relative positions subsequent to assembly and on a permanent basis until or unless they are taken apart for maintenance or repair. This method of assembly of adjacent wing structures particularly lends itself to aero structures of larger surface area but lower cross-sectional height, where the use of conventional fixings is problematic for the reasons already explained above. No method of assembling adjacent aero structures is disclosed in WO 2011/051699 which, in any event, describes a complex gear mechanism for controlling movement of one aero structure relative to the other aero structure and which is not required in the method of the present invention, as relative movement of the aero structures is not required following final assembly.

SUMMARY OF THE INVENTION

According to a first aspect of the invention, there is provided a method of attaching first and second aerofoil sections to each other comprising the steps of:
(a) positioning one aerofoil section in an initial assembly orientation with respect to the other aerofoil section so that hinge elements on each aerofoil section are in alignment with each other;
(b) inserting a hinge shaft through said aligned hinge elements to initially couple the aerofoil sections together whilst the aerofoil sections are in their initial assembly orientation;
(c) rotating one aerofoil section relative to the other aerofoil section about a compound angle defined by the hinge shaft into a second orientation in which the aerofoil sections are in their final, assembled orientation relative to each other.

The step of rotating one aerofoil section preferably comprises the step of rotating that aerofoil section such that both aerofoil sections be in the same geometric plane when in their final, assembled orientation.

Each aerofoil assembly has separation surfaces and the method may include the step of rotating one aerofoil section relative to the other aerofoil section such that the separation surfaces abut when the aerofoil sections are in their final assembled orientation relative to each other.

Preferably, the method also includes the step of passing fixings through the separation surfaces and coupling those fixings to lock the aerofoil sections in their final, assembled orientation relative to each other and prevent rotation about said hinge.

The method also includes the step of configuring the aerofoil sections such that the hinge shaft lies at an angle to a vertical axis in both a longitudinal and a chordal direction to create the compound angle, when the hinge shaft is inserted into said aligned hinge elements. Preferably, the method includes the step of configuring the aerofoil sections such that an upper end of the hinge shaft is tilted towards the tip section in the longitudinal direction and towards a trailing edge of the aerofoil sections in the chordal direction.

The aerofoil sections can comprise an inboard section and a tip section and the method can then include the step of rotating the tip section relative to the stationary inboard section about a compound angle defined by the hinge shaft into a second orientation in which the tip section is in its final, assembled orientation relative to the inboard section.

In one embodiment, the inboard section is part of a wing of an aircraft having a root end for attachment to a fuselage of an aircraft and, a remote end, the tip section comprising a winglet or 'sharklet' that is attached to said remote end by said method.

According to the invention, there is also provided an aerofoil assembly comprising first and second aerofoil sections, each aerofoil section having cooperating hinge elements that align when the aerofoil sections are positioned relative to each other in an initial assembly position, and a hinge shaft that is inserted through said aligned S hinge elements to couple said aerofoil sections together whilst the aerofoil sections are in their initial assembly position, the cooperating hinge elements being configured such that the axis of the hinge shaft lies at a compound angle relative to two axes of said aerofoil assembly so that the aerofoil sections can be rotated relative to each other into a fully assembled position.

In a preferred embodiment, each aerofoil section has separation surfaces that abut when the aerofoil sections are in their final assembled orientation relative to each other.

Preferable, the hinge elements and separation surfaces are configured such that, when the separation surfaces abut, both aerofoil sections lie in substantially the same geometric plane in their final, assembled, orientation.

In a preferred embodiment, the assembly includes fixings that extend through the separation surfaces to lock the aerofoil sections in their final, assembled orientation relative to each other and prevent rotation about said hinge.

Preferably, the aerofoil sections are configured such that the hinge shaft lies at an angle to a vertical axis in both a longitudinal and a chordal direction to create the compound angle, when the hinge shaft is inserted into said aligned hinge elements.

In a preferred embodiment, the aerofoil sections comprise an inboard section and a tip section, the tip section being rotatable relative to the stationary inboard section about a compound angle defined by the hinge shaft into a second orientation in which the tip section is in its final, assembled orientation relative to the inboard section.

The aerofoil sections may be configured such that an upper end of the hinge shaft is tilted towards the tip section in the longitudinal direction and towards a trailing edge of the aerofoil sections in the chordal direction.

In a preferred embodiment, the inboard section is part of a wing of an aircraft having a root end for attachment to a fuselage of an aircraft and, a remote end, the tip section comprising a winglet or 'sharklet' that is attachable to said remote end.

DETAILED DESCRIPTION OF THE EMBODIMENTS

Exemplary embodiments of the invention will now be described with reference to FIGS. 2 to 10 of the accompanying Figures.

Figure 1:
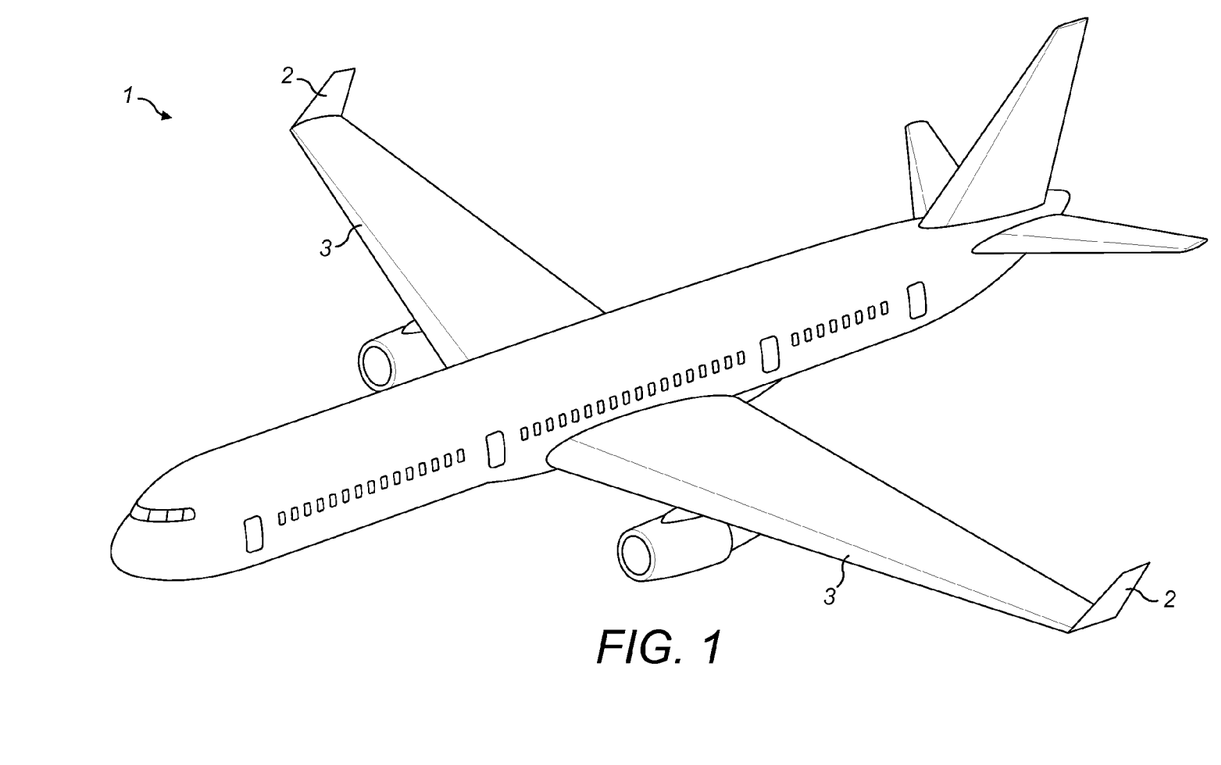
FIG. 1 is an illustration of a conventional aircraft equipped with 'sharklets' at the end of each wing remote from the fuselage of the aircraft.

Although the present invention may be used to attach any aero surface structures together, it has particular application to the attachment of a 'sharklet' or 'winglet' wingtip device to a main wing box as this joint exemplifies a highly loaded structural joint with a very small cross-sectional area in which to transfer said loads. A 'sharklet' or 'winglet' is an element that upstands from the end of each wingtip and which are known to reduce turbulence resulting in a more fuel efficient aircraft. A conventional aircraft 1 equipped with 'sharklets' 2 at the end of each of the wings 3 is illustrated in FIG. 1.

Figure 2:
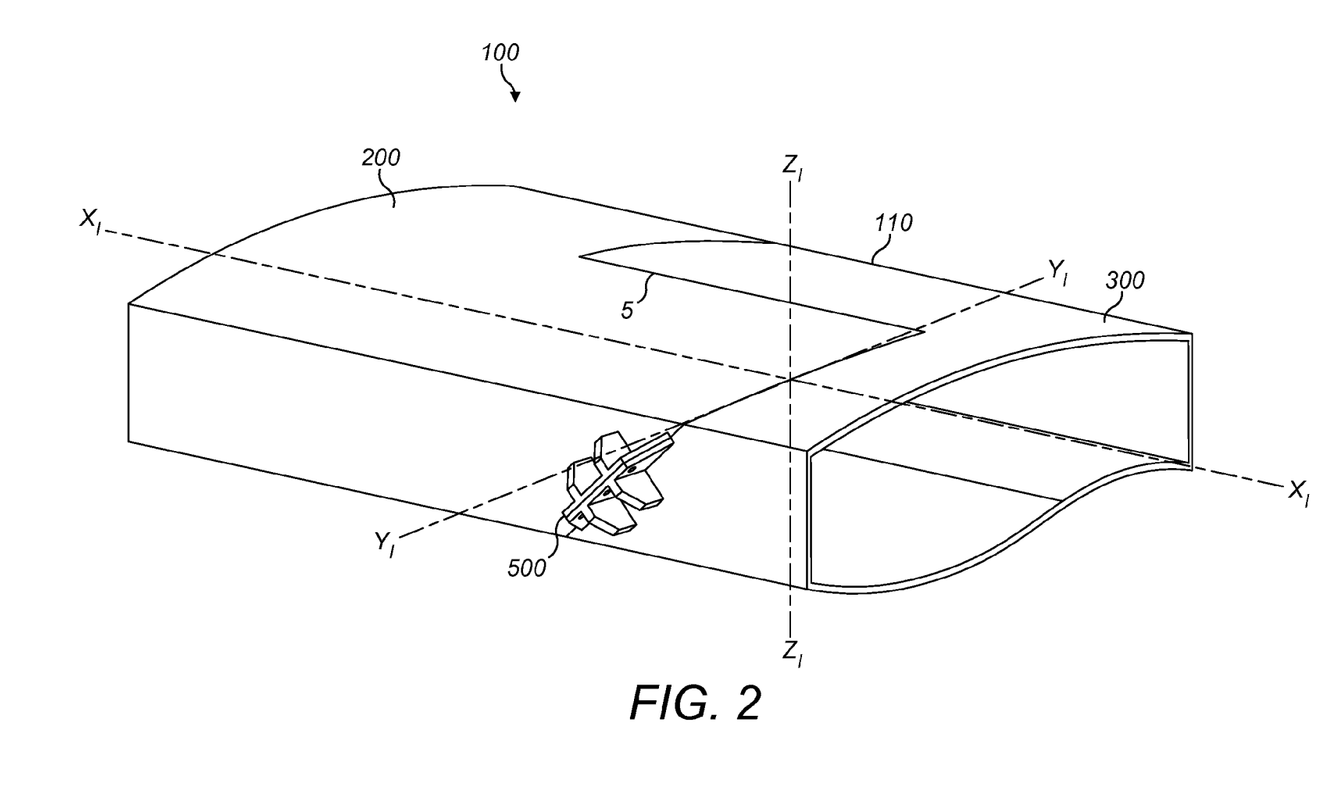
FIG. 2 is a perspective illustration of part of a wing assembly with an inboard section and a tip section aligned in a fully assembled configuration. A Cartesian coordinate system is shown on the wing assembly, comprising longitudinal, chordal and vertical axes.
Figure 3:
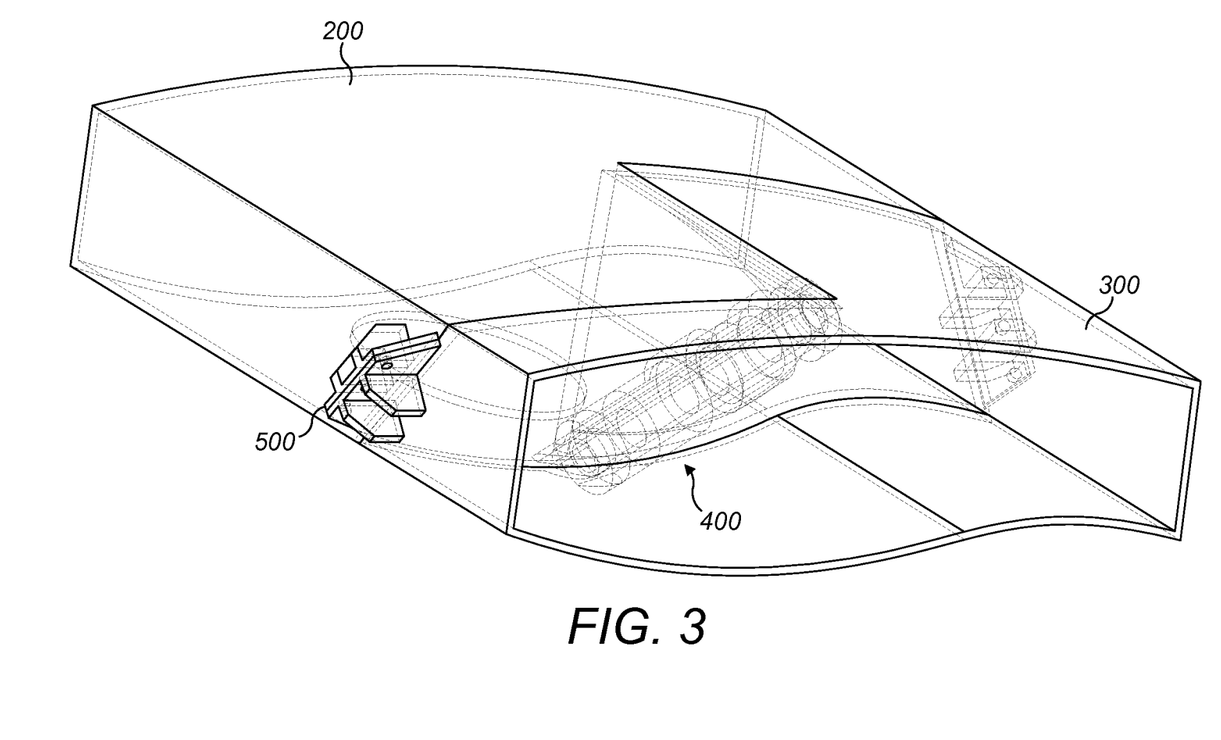
FIG. 3 is the same view as FIG. 2, but with hidden detail shown in dashed lines.
Figure 4:
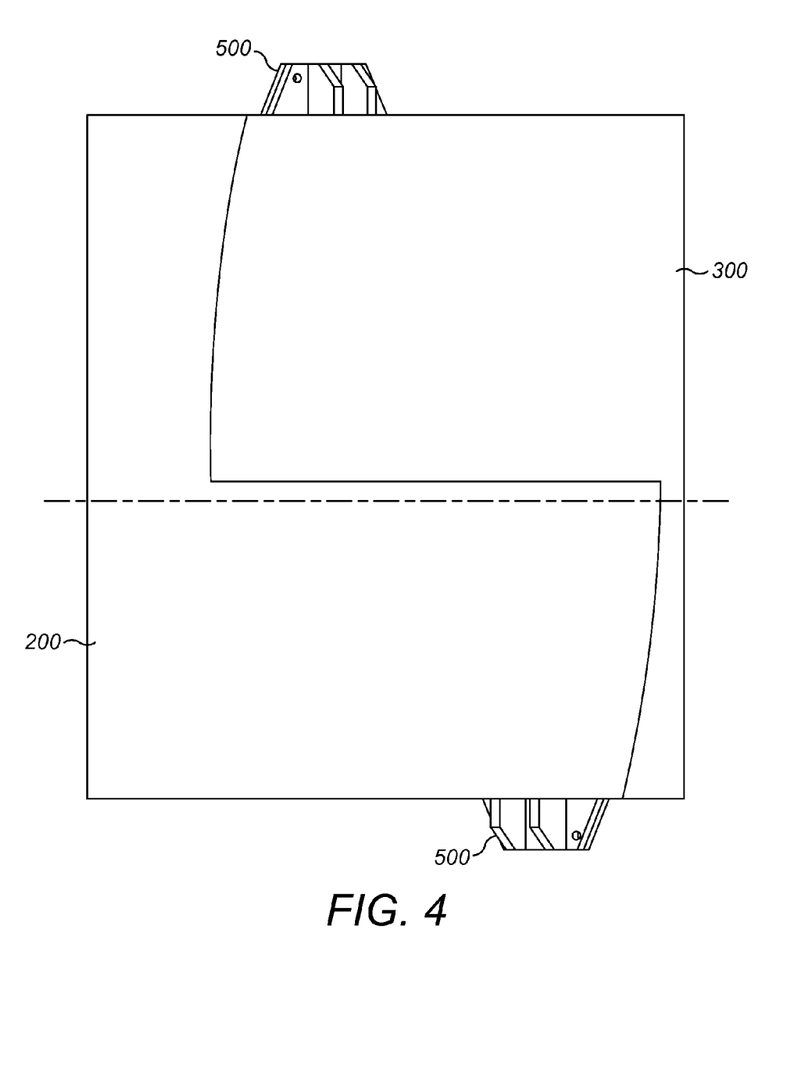
FIG. 4 is a plan view of the part of the wing assembly shown in FIGS. 2 and 3.

Referring now to FIGS. 2 to 4, an aerofoil 100 may consist of an aircraft wing 100 for use on an aircraft such as a jet airliner (only part of which is shown in the figures). The aircraft wing 100 comprises an inboard section 200, which includes a root (not shown) for securing the wing 100 to a fuselage of an aircraft. The wing 100 also comprises a tip section 300, which may be a 'sharklet' and which is located at the outer end of the wing 100. FIGS. 2 to 4 shows a portion of the inboard and outboard sections of the wing 100 in a fully, final assembled configuration in which the inboard section 200 and outboard section 300 lie in substantially the same geometric plane and in which the upper and lower surfaces are substantially coplanar.

The inboard section 200 and the tip section 300 are primarily coupled together by a hinge 400 (see FIG. 3), which is configured to allow rotation of the tip section 300 into the configuration shown in FIGS. 2, 3 and 4 from an installation or assembly position, as will be described in more detail below. The inboard and tip sections 200, 300 each comprise cooperating hinge elements 225,325 that engage when the inboard and tip sections 200,300 are brought together to enable a hinge shaft 450 (see FIG. 7) to be inserted through them to rotatably couple the inboard section 200 and the tip section 300 together. Only once the inboard and outboard sections 200,300 have been hingedly coupled to each other is the tip section 300 rotated into its permanent, assembled position, as shown in FIGS. 2, 3 and 4.

Figure 5:
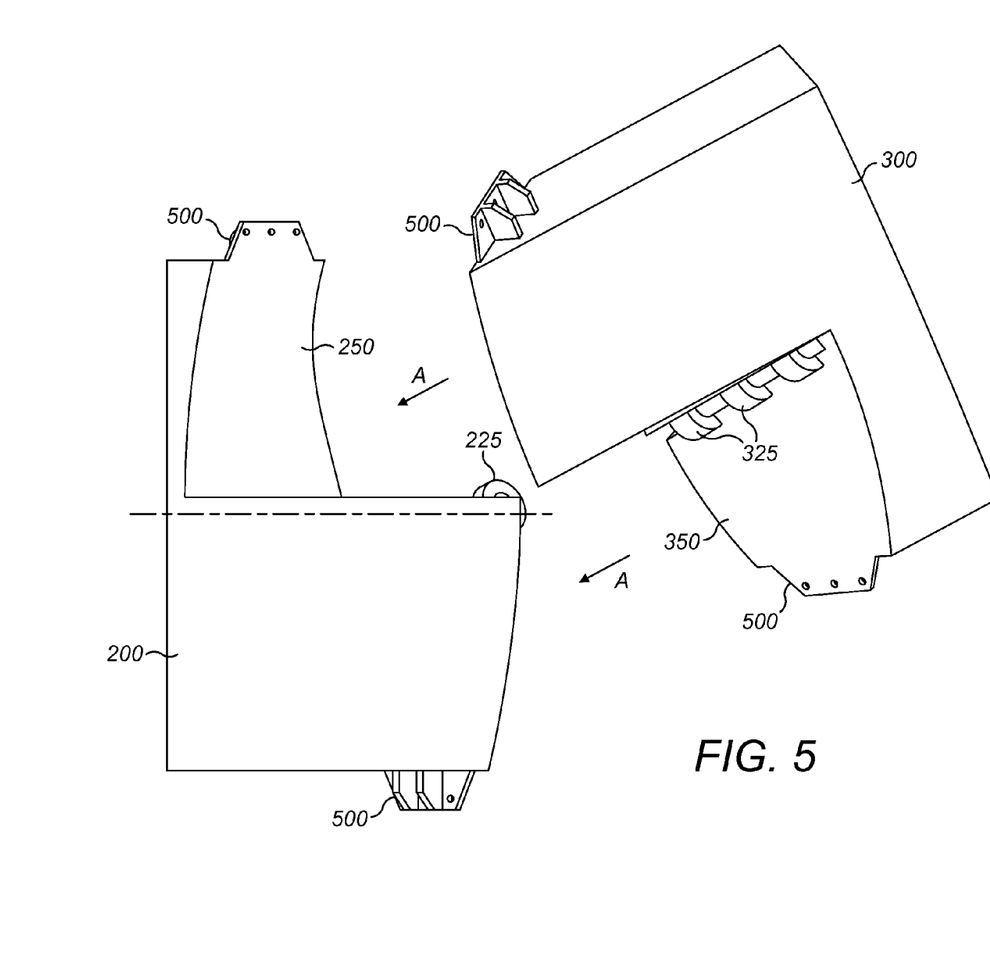
FIG. 5 shows the wing assembly prior to assembly and its which the tip section is held in a rotated or initial assembly orientation with respect to the inboard section so that cooperating elements on each wing section will engage when the two sections are brought towards each other in the relative positions shown.

FIG. 5 shows the tip section 300 being offered up to the inboard section 200 prior to insertion of the hinge shaft 450. in order for the hinge elements 225,325 to align and engage to enable the hinge shaft 450 to be inserted, the tip section 300 is offered up to the inboard section at an angle in which the inboard and tip sections 200,300 do not lie in the same geometric plane (the tip section 300 is moved towards the inboard section 200 in the direction of arrows marked 'A'). The inboard section 200 has an angled separating face 250 that mates with a correspondingly angled separating face 350 on the tip section 300, but only when the tip section 300 has been rotated relative to the inboard section 200 about the hinge 400 and into its final, assembled position.

Figure 6:
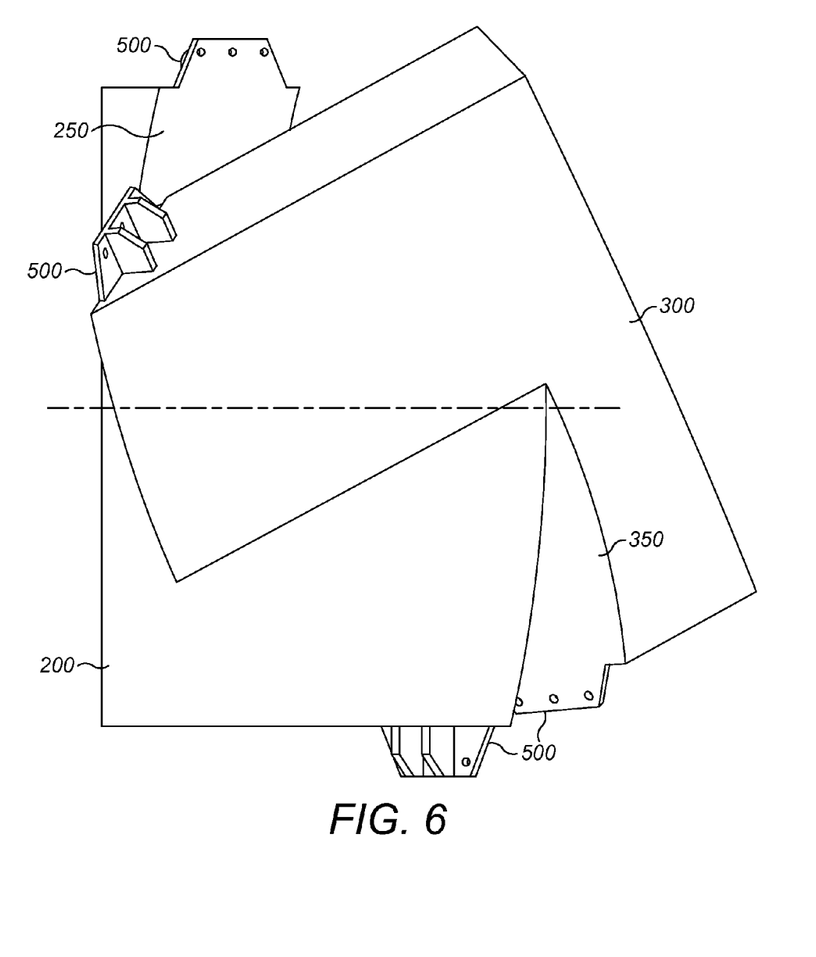
FIG. 6 shows the wing assembly of FIG. 5 immediately after the two wing sections have been brought together so that the cooperating hinge elements on each wing section engage.
Figure 7:
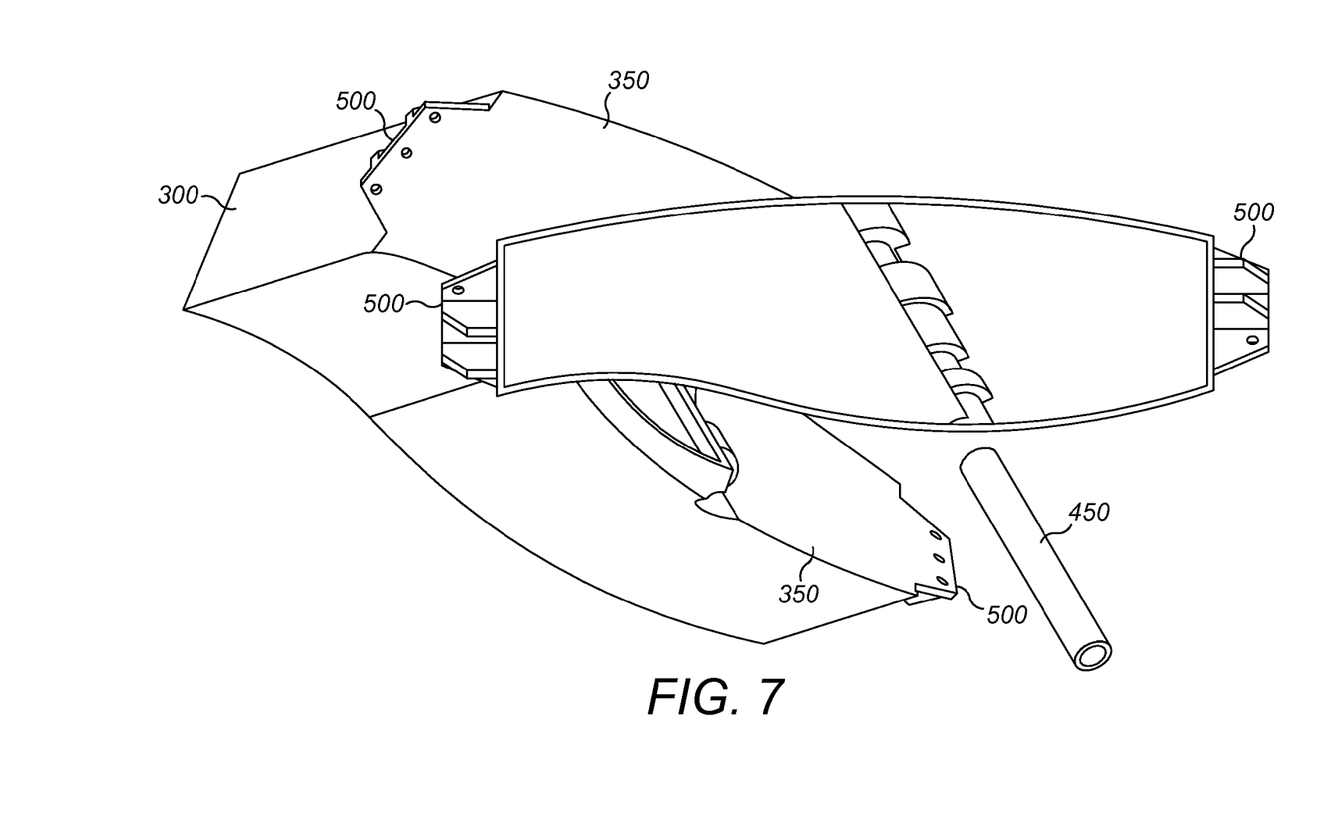
FIG. 7 shows the wing assembly of FIG. 5 in a direction extending along the wing from the root end of the wing and also shows the hinge pin that is passed through the cooperating hinge elements to initially couple the wing sections together in their assembly orientation.

FIG. 6 shows the inboard section 200 and tip section 300 in plan, after the two sections 200,300 have been brought together so that the hinge elements 225,325 cooperate with each other. FIG. 7 shows another view of the inboard and tip sections 200, 300 looking along the wing from the root towards the tip and in which the hinge pin 450 can also be seen in an orientation ready for insertion so as to couple the hinge elements 225,325 of the inboard and tip sections 200,300 together.

Figure 8:
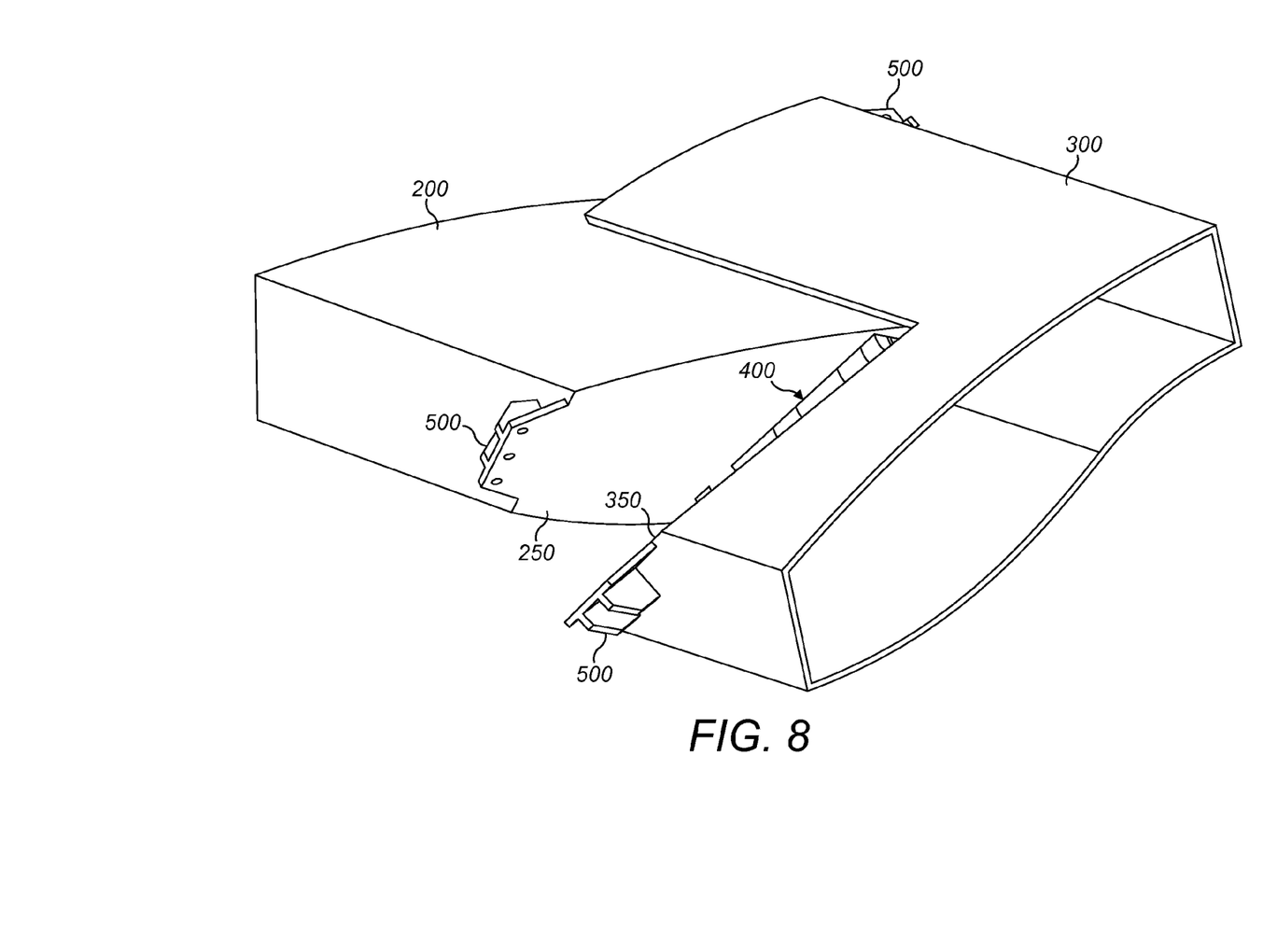
FIG. 8 shows a perspective view of the wing assembly shown in FIGS. 6 and 7 with the tip section in its initial assembly position.
Figure 9:
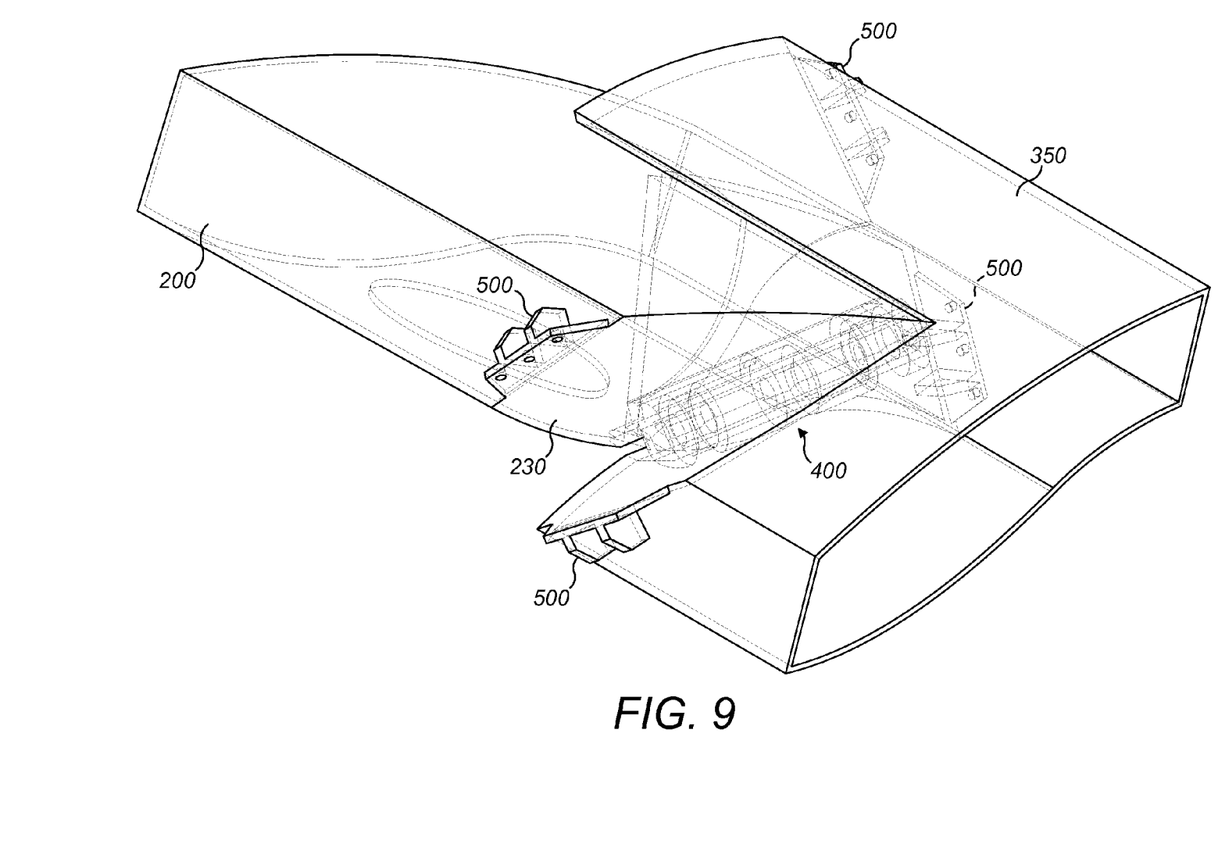
FIG. 9 shows the same perspective view of FIG. 8, but with hidden detail shown in dashed hues.

FIGS. 8 and 9 show the inboard and tip sections 200, 300 in front perspective views, with hidden detail shown in FIG. 9 and in which the orientation of the hinge 400 can be seen. A rear perspective view is also shown in FIG. 10.

Once inserted, the hinge shaft 450 can be retained in position by screw-fixing and/or clamping and any shimming operations can be carried out at this stage, whilst access is skill available to the hinge 400 and the mating faces 250,350 between the inboard and tip sections 200,300.

Figure 10:
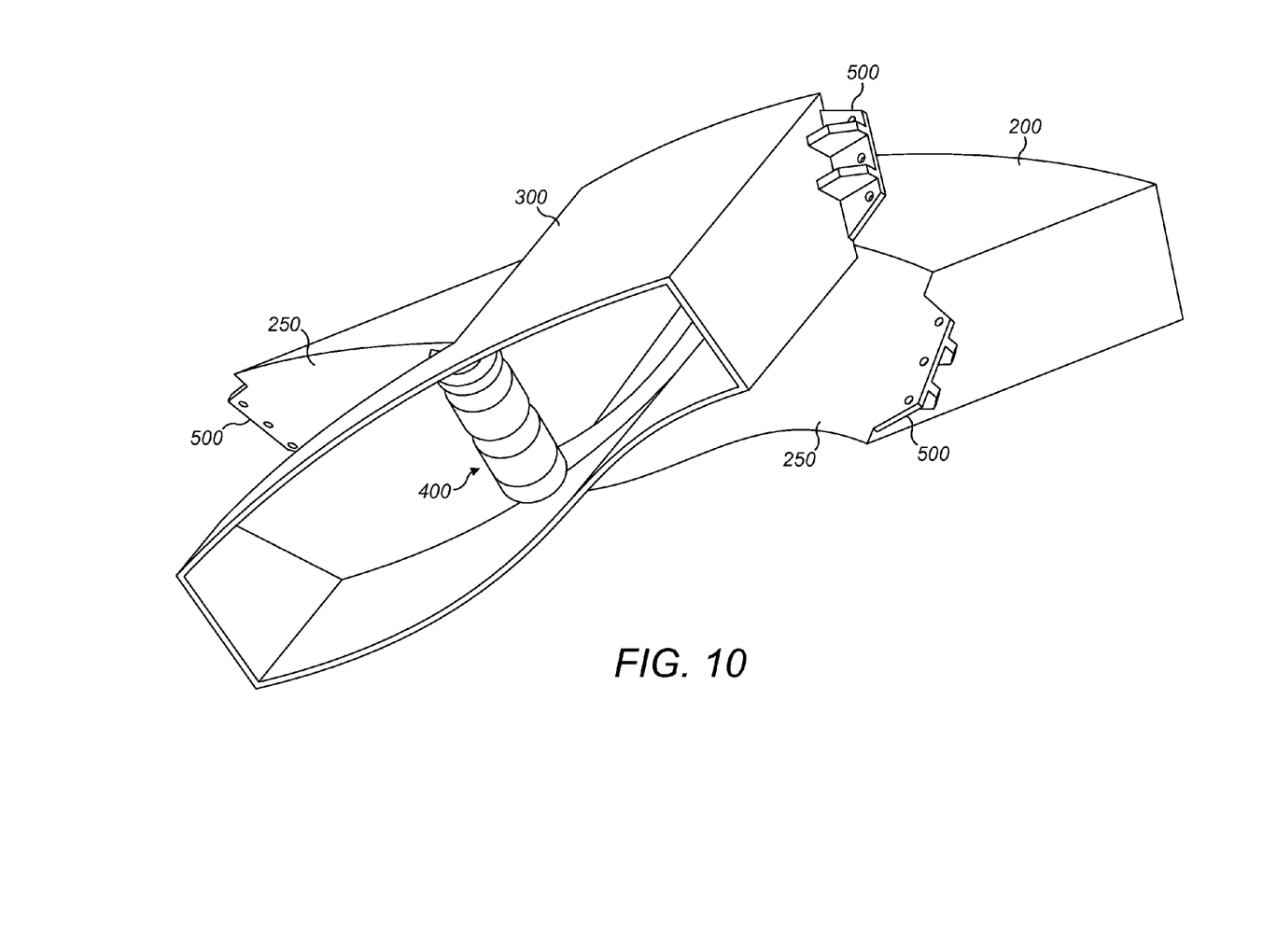
FIG. 10 shows a rear perspective view of the wing assembly shown in FIGS. 6 to 9.

The transition between the installation position as shown in FIGS. 8, 9 and 10 and the fully assembled position of the wing tip section 300, as shown in FIGS. 2, 3 and 4 involves a dual rotational movement, i.e. a component of rotation of the tip section 300 about at least two separate and perpendicular axes of rotation. The geometric plane of the tip section 300 in the assembly position may be up to ninety degrees to the fixed geometric plane of the inboard section 200.

In order to transition from an assembly position, as shown in FIGS. 8 to 10, into its final, assembled position, as shown in FIGS. 2, 3 and 4, in which the separation faces 250, 350 meet, the tip section 300 must have a component of rotation about more than one axis.

The angle of the hinge shaft 450 is referred to below using a Cartesian coordinate system comprising a longitudinal axis $X_1$ along the length of the inboard section 200 of the wing 100, a chordal axis $Y_1$ across the width of the inboard section 200 of the wing 100 and a vertical axis $Z_1$ through the depth of the inboard section 200 of the wing 100, as shown in FIG. 2.

In order to achieve a component of rotation about longitudinal axis $X_1$ and chordal axis $Y_1$, the cooperating hinge elements 225,325 are positioned such that the hinge shaft 450 is oriented at a compound angle between the inboard section 200 and the tip section 300.

Starting from a position parallel with the vertical axis $Z_1$, the hinge shaft 450, and the cooperating hinge elements on each of the inboard and tip sections 200, 300, is tilted in both the longitudinal $X_1$ and chordal $Y_1$ directions to provide a compound angle hinge line comprising a longitudinal tilt component and a chordal tilt component. Starting from a vertical position, the top end of the hinge shaft 450 closest to the upper edge of the wing 100 is tilted with respect to the bottom end of the shaft 450 both towards the trailing edge 110 of the wing 100 (chordal tilt component) and towards the tip of the wing 100 (longitudinal tilt component). It will be appreciated that the precise orientation of the hinge shaft 450 and cooperating hinge elements 225,325 may be configured in dependence of the exact desired rotational movement of the tip section 300.

At the trailing edge of the wing 100, the abutting faces 250,350 of the inboard and tip sections 200, 300 of the wing 100 may meet each other at an angle which is approximately ninety degrees to the longitudinal tilt element of the hinge shaft 450. At the leading edge of the wing 100, the abutting faces 250,350 of the inboard and to tip sections 200, 300 of the wing 100 may meet each other at an angle which is approximately equal to the chordal tilt element of the hinge shaft 450. Therefore, the angle at which the abutting faces 250,350 meet each other at the leading edge of the wing 100 may differ from the angle at which the abutting faces 250,350 meet each other at the trailing edge of the wing 100. The separation line S between the inboard and tip sections 200, 300 may extend in a curve across the upper and lower surfaces of the wing 100. A significant portion of the separation line may extend across the upper and lower faces of the wing 100 at an acute angle with respect to the chordal axes $Y_1$. The separation line S may also extend across the leading and trailing faces of the wing 100 at an acute angle with respect to the vertical axes $Z_1$ and $Z_1$.

Once the tip section 300 has been rotated from its initial assembly position into its assembled position so that the separation faces 250, 350 meet, additional fixings 500 may be provided to couple the separation faces 250, 350 together in a more permanent way or until such time the tip section 300 needs to be removed or replaced during maintenance. These fixings 500 are shown on an outside of the inboard and tip sections 200,300 in the Figures but this is for clarity only and it will be appreciated that these fixing points are more likely to be located inside the inboard and tip sections 200,300 with access being obtained via a removable panel in as lower cover on the inboard and/or on the tip section 200,300.

It will be appreciated that the aerofoil 100 described above could be used on any type of aircraft, including military aircraft, helicopters and gliders.

The invention claimed is:

1. A method of attaching first and second aerofoil sections to each other comprising the steps of:
   (a) positioning one aerofoil section in an initial assembly orientation with respect to the other aerofoil section so that hinge elements on each aerofoil section are in alignment with each other,
   (b) inserting a hinge shaft through said aligned hinge elements to initially couple the aerofoil sections together whilst the aerofoil sections are in their initial assembly orientation;
   (c) rotating one aerofoil section relative to the other aerofoil section about a compound angle defined by the hinge shaft into a second orientation in which the aerofoil sections are in their final, assembled orientation relative to each other.

2. A method according to claim 1, wherein the step of rotating one aerofoil section comprises the step of rotating that aerofoil section such that both aerofoil sections lie in substantially the same geometric plane when in their final, assembled orientation.

3. A method according to claim 1, wherein the each aerofoil assembly has separation surfaces and the method includes the step of rotating one aerofoil section relative to the other aerofoil section such that the separation surfaces abut when the aerofoil sections are in their final assembled orientation relative to each other.

4. A method according to claim 3, wherein the method includes the step of passing fixings through the separation surfaces and coupling those fixings to lock the aerofoil sections in their final, assembled orientation relative to each other and prevent rotation about said hinge.

5. A method according to claim 1, wherein the method includes the step of configuring the aerofoil sections such that the hinge shaft lies at an angle to a vertical axis in both a longitudinal and a chordal direction to create the compound angle, when the hinge shaft is inserted into said aligned hinge elements.

6. A method according to claim 5, wherein the method includes the step of configuring the aerofoil sections such that an upper end of the hinge shaft is tilted towards the tip section in the longitudinal direction and towards a trailing edge of the aerofoil sections in the chordal direction.

7. A method according to claim 1, wherein the aerofoil sections comprise an inboard section and a tip section, the method including the step of rotating the tip section relative to the stationary inboard section about a compound angle defined by the hinge shaft into a second orientation in which the tip section is in its final, assembled orientation relative to the inboard section.

8. A method according to claim 7, wherein the inboard section is part of a wing of an aircraft having a root end for attachment to a fuselage of an aircraft and, a remote end, the tip section comprising a winglet or 'sharklet' that is attached to said remote end by said method.

9. An aerofoil assembly comprising first and second aerofoil sections, each aerofoil section having cooperating hinge elements that align when the aerofoil sections are positioned relative to each other in an initial assembly position, and a hinge shaft that is inserted through said aligned hinge elements to couple said aerofoil sections together whilst the aerofoil sections are in their initial assembly position, the cooperating hinge elements being configured such that the axis of the hinge shaft lies at a compound angle relative to two axes of said aerofoil assembly so that the aerofoil sections can be rotated relative to each other into a fully assembled position.

10. An aerofoil assembly according to claim 9, wherein each aerofoil section has separation surfaces that abut when the aerofoil sections are in their final assembled orientation relative to each other.

11. An aerofoil assembly according to claim 10, wherein the hinge elements and separation surfaces are configured such that, when the separation surfaces abut, both aerofoil sections lie in substantially the same geometric plane in their final, assembled, orientation.

12. An aerofoil assembly according to claim 10, comprising fixings that extend through the separation surfaces to lock the aerofoil sections in their final, assembled orientation relative to each other and prevent rotation about said hinge.

13. An aerofoil assembly according to claim 9, wherein the aerofoil sections are configured such that the hinge shaft lies at an angle to a vertical axis in both a longitudinal and a chordal direction to create the compound angle, when the hinge shaft is inserted into said aligned hinge elements.

14. An aerofoil assembly according to claim 1, wherein the aerofoil sections comprise an inboard section and a tip section, the tip section being rotatable relative to the stationary inboard section about a compound angle defined by the hinge shaft into a second orientation in which the tip section is in its final, assembled orientation relative to the inboard section.

15. An aerofoil assembly according to claim 14, wherein the aerofoil sections are configured such that an upper end of the hinge shaft is tilted towards the tip section in the longitudinal direction and towards a trailing edge of the aerofoil sections in the chordal direction.

16. An aerofoil assembly according to claim 14, wherein the inboard section is part of a wing of an aircraft having a root end for attachment to a fuselage of an aircraft and, a remote end, the tip section comprising a winglet or 'sharklet' that is attachable to said remote end.

* * * * *